United States Patent [19]
Heurtaux et al.

[11] 3,925,393
[45] Dec. 9, 1975

[54] NOVEL SALTS OF VINCANOL

[75] Inventors: Simone Heurtaux, Allee Dunand; Germain Costerousse, Vernouillet, both of France

[73] Assignee: Roussel Uclaf, Paris, France

[22] Filed: July 9, 1973

[21] Appl. No.: 377,503

[30] Foreign Application Priority Data
July 13, 1972 France ............................ 72.25495

[52] U.S. Cl. ............................ 260/293.53; 424/267
[51] Int. Cl.² ................................. C07D 371/22
[58] Field of Search ............................ 260/293.53

[56] References Cited
UNITED STATES PATENTS

| | | | |
|---|---|---|---|
| 3,415,831 | 12/1968 | Weisbach | 260/288 |
| 3,542,796 | 11/1970 | Schut | 260/295 |

*Primary Examiner*—G. Thomas Todd
*Attorney, Agent, or Firm*—Bacon & Thomas

[57] ABSTRACT

Novel racemic or optically active mixed alkali metal or ammonium phosphate salts with vincanol, methods for their preparation, and their pharmaceutical use.

2 Claims, No Drawings

NOVEL SALTS OF VINCANOL

The present invention concerns novel salts of vincanol, the racemic or optically active mixed alkali metal or ammonium phosphates of vincanol of Formula I:

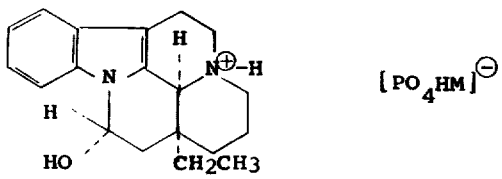

wherein M represents an atom of an alkali metal or $NH_4$.

Among the compounds of Formula I, one can designate as a preferred compound the mixed sodium phosphate of vincanol, corresponding to Formula I in which M represents sodium. One can equally cite the salts of potassium and lithium.

Vincanol, described in French Pat. No. 1,586,697 and by Lajosne in Acta Pharm. Hungarica, 38, 71(1968), possesses hypo-tensive and vaso-dilating properties which justify its use in cardiovascular therapy. Unfortunately, vincanol is neither soluble in water nor therapeutically compatible solvents. It is therefore necessary to form a salt from it in order to be able to prepare a form soluble in water or easily diffusible orally. The known salts of vincanol, for example those formed with strong acids, decompose rapidly in solution to form either an epimer at the 16-position, isovincanol, or a dehydration product, apovincanol.

These chemical reactions on the vincanol molecule are also produced after salification by a mineral acid such as hydrochloric acid or perchloric acid, as well as by an organic acid such as ascorbic acid.

It has now been found that it is possible to resolve this problem. In effect, the new vincanol salts of Formula I do not present such disadvantages.

These new salts of vincanol are somewhat soluble in water and very soluble in aqueous solutions of alkali phosphates. Moreover, their aqueous solutions are stable at room temperature.

Thus, the novel salts of vincanol of Formula I represent soluble and stable forms of vincanol thereby facilitating their use in therapy, especially for parenteral use.

The invention also extends to a method of preparation of the compounds of Formula I, characterized by the reaction of a solution of a monoalkali metal or monoammonium phosphate on vincanol in solution in an organic solvent, and the isolation of the mixed alkali metal or ammonium phosphate salt of vincanol. According to the preferred method of carrying out the process, the monoalkali metal phosphate is monosodium phosphate, the organic solvent being a lower alkanol, such as ethanol, whereby one obtains the mixed phosphate of vincanol and sodium.

The invention also comprises a variation of the above process characterized in that one dissolves vincanol in an aqueous solution of a monoalkali metal phosphate or monoammonium phosphate and a dialkali metal phosphate or diammonium phosphate having a pH between 6 and 7 to obtain "in situ" a compound of Formula I.

According to the preferred method of this procedure, the monoalkli metal phosphate is the monosodium phosphate and the dialkali metal phosphate is disodium phosphate. One thus obtains a solution of the mixed sodium phosphate of vincanol without isolating the active principle.

The invention also includes the therapeutic application of the mixed alkali metal or ammonium phosphates of vincanol, notably as hypotensive and dilating medicaments for cerebral microcirculation.

The invention also comprises pharmaceutical compositions containing, as active principle, at least one mixed alkali metal or ammonium phosphate of vincanol of the Formula I.

For the preparation of pharmaceutical compositions, it is possible to use the mixed alkali metal or ammonium phosphates of vincanol previously isolated or prepared "in situ". It can be more convenient or advantageous to use an active principle previously formed or isolated. One is also able to operate under conditions where the mixed alkali metal or ammonium phosphate of vincanol is not separated and to utilize the solution that it contains for the preparation of pharmaceutical dosage forms.

The pharmaceutical dosage forms containing the mixed alkali metal or ammonium phosphate of vincanol are given in a form adopted for oral, parenteral, rectal, or per-lingual use, notably in the form of injectionable solutions distributed in ampoules, multi-dose flasks, ready-to-inject syringes, microcrystalline suspensions, or lyophilized preparations, in the form of pills, tablets, gelatin capsules, syrups, drinkable ampoules or drops, or in the form of suppositories.

The average dose varies according to the age of the subject and the therapeutic indication. It can, for example, range from 2.5 mg to 10 mg per dose and from 5 to 25 mg per day.

The mixed alkali metal or ammonium phosphates of vincanol of Formula I possess therapeutic indications analogous to those of vincanol. They are suitable, in particular, in order to combat or prevent arterial hypertension, cerebral arteriosclerosis, the after-effects of cerebral circulatory troubles ; they permit the prevention or diminution of the effects of meningeal or cerebral hemorrhages.

The examples which follow illustrate the invention without limiting it in any way.

EXAMPLE I

Preparation of the Mixed Sodium Phosphate of Vincanol 480 mg of vincanol and 4 cc of ethanol are placed in a 20 cc round-bottomed flask. The mixture is warmed to 50°C in order to completely dissolve the vincanol. One then adds all at once a solution of:

| | |
|---|---|
| monosodium phosphate · $2H_2O$ | 250 mg |
| distilled water | 4 cc |

There is complete solution, then after a few minutes crystallization begins. The mixture is then stirred for 30 minutes at room temperature and allowed to remain 4 hours at 0°C. The mixture is then drained and dried under vacuum. One thus obtains 600 mg of the mixed sodium phosphate of vincanol in a yield of 91%.

The phosphate mixture melts towards 270-280°C with decomposition.

Analysis: $C_{19}H_{26}N_2O_5PNa = 416.41$; Calculated: %N 6.73, %P 7.45. Found: 6.4, 7.3–7.5.

The mixed sodium vincanol phosphate is somewhat soluble in water, but is very soluble in a monosodium phosphate-disodium phosphate buffer. The aqueous solution is perfectly stable for 24 hours at room temperature.

Thin-layer chromatography shows a total absence of isovincanol. There is therefore neither isomerization nor alteration at room temperature.

EXAMPLE II

Examples of Pharmaceutical Forms

Lyophilized Injectionable Forms

| 1. vincanol | 7.5 g |
|---|---|
| monosodium phosphate · 2H$_2$O | 37.5 g |
| disodium phosphate · 12H$_2$O | 37.5 g |
| mannitol | 100 g |
| sodium mercuro thiolate | 0.3 g |

The compounds are dissolved in 3,000 cc of distilled water, the solution obtained is filtered through a sterilizing filter and collected in sterilized flasks at the rate of 3 cc per flask, then the lyophilization of the solution is carried out. 1,000 flasks are thus prepared.

For therapeutic use, the lyophilized product is dissolved in 5 cc of distilled water at the time of injection.

| 2. vincanol | 5 g |
|---|---|
| monosodium phosphate · 2H$_2$O | 37.5 g |
| disodium phosphate · 12H$_2$O | 37.5 g |
| inositol | 100 g |
| sodium mercuro thiolate | 0.3 g |
| distilled water | 5,000 cc |

The preparation is the same as in the example above. There are thus prepared 1,000 flasks.

| 3. vincanol | 2.5 g |
|---|---|
| monosodium phosphate · 2H$_2$O | 37.5 g |
| disodium phosphate · 12H$_2$O | 37.5 g |
| inositol | 100 g |
| sodium mercuro thiolate | 0.3 g |

There is thus prepared 1,000 lyophilized flasks.

| 4. Ampoules | |
|---|---|
| mixed phosphate of sodium and vincanol | 10.4 g |
| monosodium phosphate | 34.5 g |
| disodium phosphate, hydrated | 37.5 g |
| aqueous excipient | 3,000 cc |

The mixture is shaken strongly. After complete dissolution the mixture is filtered and divided among 1,000 3-cc ampoules.

Study of the Acute Toxicity By Intra-Venous Use of the Lyophilized Solution of Mixed Phosphate of Vincanol and Sodium.

The lyophilized preparation of the mixed phosphate of vincanol and sodium is dissolved in sterile, non-pyrogenic, distilled water to give a concentration of 2.5 mg/ml. The solution thus obtained is then administered intravenously with a Braun perfusor (speed of perfusion 0.750 ml/min.) to homogeneous groups of 10 female Swiss SPF* mice weighing from 19–21g, in variable volume and in the doses given below:

| VOLUME | DOSES | OBSERVATION DAYS | MORTALITY |
|---|---|---|---|
| ml/kg | mg/kg | 1 2 3 4 5 6 7 8 | |
| 7.2 | 18 | | 0/10 |
| 9.6 | 24 | 4 | 4/10 |
| 12.4 | 31 | 8 | 8/10 |
| 16.0 | 40 | 10 | 10/10 |

Under the conditions of the experiment, after 7 days of observation, the lethal dose 50, calculated according to the method of Litchfield and Wilcoxon, is established at:

$LD_{50} = 25.5$ mg/kg

Confidence limits at 95% (22.3–29.0 mg/kg)

Under analogous experimental conditions, the $LD_{50}$ of vincanol put in solution extemporaneously is 30 mg/kg (confidence limits at 95%, 26–35 mg/kg).

SYMPTOMS:

At a dosage of 18 mg/kg, several slight convulsions of short duration have been noted.

One hour after injection, the mice appeared and behaved normally.

At a dosage of 24 and 31 mg/kg, respiratory trouble was observed characterized by momentary apnea with cyanosis followed by polypnea. Furthermore more or less intense Convulsions are observed. The animals are then in a comatose state which results in death for some of them.

About 1 hour after the injection, the surviving mice appear and behave normally.

At a dose of 40 mg/kg, death occurs very rapidly, several seconds after the injection during more or less intense convulsions.

Test of Chronic Toxicity When Administered Intravenously to the Rabbit

Operational Procedure

The mixed phosphate of vincanol and sodium is administered intravenously in the marginal vein of the ear in a volume of 2 ml/kg to homogeneous groups of six male Normandy rabbits, having a body weight of about 1940g, 5 days a week for two consecutive weeks at doses of 1-2-5 mg/kg.

One group of six rabbits receiving the solvent under the same conditions served as the control group.

The animals placed in individual cages were fed food and water "ad libitium".

RESULTS

CLINICAL OBSERVATIONS

General State

With 1 and 2 mg/kg dosages, the general state of the rabbits has been good. Their appearance and behavior have been normal. Only one rabbit receiving 2 mg/kg exhibited some convulsions 30 minutes after the second injection.

At a dose of 5 mg/kg, the general state has been on the contrary rather mediocre.

In effect, all the rabbits in the group showed one or more times signs of difficulties in chewing as well as tremors followed either by convulsions or by opisthotonos.

The symptoms appear shortly after completion of the injection and last from about ½ to 1½ hours depending on the animals.

The symptomatology is identical to that observed after injection with the same dosage of vincanol.

Mortality

There are no deaths in the control group and in treated groups II (1 mg/kg) and III (2 mg/kg).

In Group IV (5 mg/kg), two rabbits died, one on the seventh and the other on the 13th day.

Histological examination of the organs removed from these animals only revealed renal or hepatic alterations of post-mortem origin.

What is claimed is:

1. A racemic or optically active mixed alkali metal or ammonium phosphate salt of Vincanol of the formula:

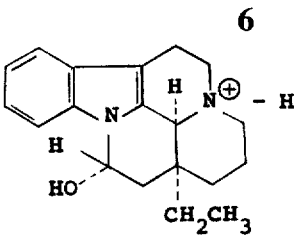 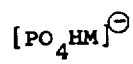

wherein M is $NH_4$ or an alkali metal.

2. The compound of claim 1 wherein M is sodium.